US012587023B2

(12) United States Patent  
Xu et al.

(10) Patent No.:  US 12,587,023 B2  
(45) Date of Patent:  Mar. 24, 2026

(54) BATTERY POWER SUPPLY DEVICE AND BATTERY POWER SUPPLY SYSTEM

(71) Applicants: Zhangzhou Kehua Electric Technology Co., Ltd, Zhangzhou (CN); Kehua Data Co., Ltd, Xiamen (CN)

(72) Inventors: Yongzhi Xu, Zhangzhou (CN); Yangyuan Chen, Zhangzhou (CN); Weilong Zhong, Zhangzhou (CN); Baosen Zhang, Zhangzhou (CN); Xin Yang, Zhangzhou (CN)

(73) Assignees: Zhangzhou Kehua Electric Technology Co., Ltd., Zhangzhou (CN); Kehua Data Co., Ltd., Xiamen (CN)

( * ) Notice: Subject to any disclaimer, the term of this patent is extended or adjusted under 35 U.S.C. 154(b) by 648 days.

(21) Appl. No.: 18/146,797

(22) Filed: Dec. 27, 2022

(65) Prior Publication Data

US 2023/0275445 A1      Aug. 31, 2023

(30) Foreign Application Priority Data

Feb. 28, 2022      (CN) .......................... 202210192271.6

(51) Int. Cl.
| | |
|---|---|
| *H02J 7/80* | (2026.01) |
| *H02J 7/96* | (2026.01) |
| *H02M 1/00* | (2007.01) |

(52) U.S. Cl.
CPC .................. *H02J 7/80* (2026.01); *H02J 7/96* (2026.01); *H02M 1/0067* (2021.05); *H02J 2207/20* (2020.01)

(58) Field of Classification Search
CPC .................................................... H02J 2207/20
See application file for complete search history.

(56) References Cited

U.S. PATENT DOCUMENTS

| | | | |
|---|---|---|---|
| 8,810,070 | B2 * | 8/2014 | Butzmann ............. H02J 7/0013 |
| | | | 307/83 |
| 11,509,233 | B1 * | 11/2022 | Keister ................. B60L 3/0046 |
| 2011/0273024 | A1 * | 11/2011 | Butzmann ............. H02J 7/0013 |
| | | | 307/82 |
| 2016/0261205 | A1 * | 9/2016 | Kolar ...................... H02M 1/32 |
| 2016/0294204 | A1 * | 10/2016 | Deokar .................... H02J 7/34 |
| 2021/0028641 | A1 * | 1/2021 | Ilic ...................... H02J 7/00714 |
| 2022/0021221 | A1 * | 1/2022 | Tyagi .................... H02M 1/007 |
| 2022/0021223 | A1 * | 1/2022 | Wang ........................ H02J 1/02 |
| 2022/0118864 | A1 * | 4/2022 | Zhang .................... B60L 53/14 |
| 2022/0416660 | A1 * | 12/2022 | Zhou ...................... H02J 7/0024 |
| 2025/0050742 | A1 * | 2/2025 | Hong .................... B60L 58/21 |
| 2025/0079866 | A1 * | 3/2025 | Zhong .................. H02J 7/0068 |
| 2025/0088023 | A1 * | 3/2025 | Hu ........................... H02J 7/02 |

* cited by examiner

*Primary Examiner* — Tynese V McDaniel  
(74) *Attorney, Agent, or Firm* — AP3 Law Firm PLLC

(57) ABSTRACT

The present application provides a battery power supply device and a battery power supply system. The battery power supply device includes a control module, a DC/DC conversion module and a battery. The DC/DC conversion module includes N DC/DC converters connected in series or in parallel. When the battery power is constant, more output current can be obtained when the N DC/DC converters are in parallel, and more output voltage can be obtained when the N DC/DC converters are in series. Embodiments enable a battery power supply device or system to meet voltage requirements of different loads and improve applicability of a battery.

16 Claims, 6 Drawing Sheets

BATTERY POWER SUPPLY DEVICE AND BATTERY POWER SUPPLY SYSTEM

CROSS-REFERENCE TO RELATED APPLICATIONS

This application claims priority to Chinese Patent Application No. 202210192271.6, filed on Feb. 28, 2022. The disclosure of the aforementioned application is hereby incorporated by reference in its entirety.

TECHNICAL FIELD

The present application relates to the technical field of power supply, and particularly relates to a battery power supply device and a battery power supply system.

BACKGROUND

Batteries such as lithium batteries have been widely used in various fields due to their high working voltage, high energy density, low self discharge rate and no memory effect. In the prior art, the range of output voltage of the battery is limited, which can easily adapt to the voltage demand of one load, but cannot adapt to the battery voltage demand of multiple loads.

SUMMARY

These and other problems are generally solved or circumvented, and technical advantages are generally achieved, by embodiments of the present disclosure which provide a battery power supply device and a battery power supply system.

Technical Problems

The present application provides a battery power supply device and a battery power supply system, which can meet the voltage requirements of different loads and improve the applicability of the battery module.

Technical Solutions

In order to achieve the above technical effects, the present application provides a battery power supply device, including: a control module, a battery and a DC/DC conversion module; the DC/DC conversion module is connected between the battery and a load, the DC/DC conversion module includes N DC/DC converters, the N DC/DC converters include, respectively, N input ends that are connected with the battery, and include, respectively, N output ends that are connectable in series or in parallel, N being an integer not less than 2; and the control module is connected with the DC/DC conversion module, and is configured for determining a connection mode of the N output ends of the N DC/DC converters when the battery power supply device supplies power to the load, and controlling, according to the connection mode, an output voltage or an output current of the DC/DC conversion module to supply power to the load, the connection mode being in series or in parallel.

In one possible implementation, an output end of each DC/DC converter of the N DC/DC converters includes a positive output end and a negative output end, N is 2, the positive output end of a first DC/DC converter of the N DC/DC converters is a positive output end of the DC/DC conversion module, the negative output end of a second DC/DC converter of the N DC/DC converters is a negative output end of the DC/DC conversion module, the load is connected between the positive output end of the DC/DC conversion module and the negative output end of the DC/DC conversion module, and the battery power supply device further includes: a series-parallel detection module, configured for detecting a voltage between the negative output end of the first DC/DC converter and the positive output end of the second DC/DC converter; and determining the connection mode of the N output ends of the N DC/DC converters includes: when the voltage detected by the series-parallel detection module is 0, determining that the connection mode of the N output ends of the N DC/DC converters is in series; and when the voltage detected by the series-parallel detection module is not 0, determining that the connection mode of the N output ends of the N DC/DC converters is in parallel.

In one possible implementation, the battery power supply device further includes a series-parallel detection module configured for detecting the output voltage of the DC/DC conversion module; and determining the connection mode of the N output ends of the N DC/DC converters includes: when the output voltage is greater than a preset voltage threshold, determining that the connection mode of the N output ends of the N DC/DC converters is in series; and when the output voltage is not greater than the preset voltage threshold, determining that the connection mode of the N output ends of the N DC/DC converters is in parallel.

In one possible implementation, the control module is further configured for: when the connection mode of the N output ends of the N DC/DC converters is in series, stabilizing N voltages that are output respectively by the N DC/DC converters such that the output voltage of the DC/DC conversion module is equal to a target voltage; and when the connection mode of the N output ends of the N DC/DC converters is in parallel, equalizing N currents that are output respectively by the N DC/DC converters such that the N currents are equal.

In one possible implementation, an output end of each DC/DC converter of the N DC/DC converters includes a positive output end and a negative output end, the connection mode of the N output ends of the N DC/DC converters is in series, the positive output end of a first DC/DC converter of the N DC/DC converters is a positive output end of the DC/DC conversion module, the negative output end of an Nth DC/DC converter of the N DC/DC converters is a negative output end of the DC/DC conversion module, the negative output end of an ith DC/DC converter is connected with the positive output end of an (i+1)th DC/DC converter, and $1 \leq i \leq N-1$, the load being connected between the positive output end of the DC/DC conversion module and the negative output end of the DC/DC conversion module.

In one possible implementation, an output end of each DC/DC converter of the N DC/DC converters includes a positive output end and a negative output end, N is an even number and the connection mode of the N output ends of the N DC/DC converters is in series, the positive output end of a first DC/DC converter of the N DC/DC converters is a positive output end of the DC/DC conversion module, the negative output end of an Nth DC/DC converter of the N DC/DC converters is a negative output end of the DC/DC conversion module, the negative output end of an ith DC/DC converter is connected with the positive output end of an (i+1)th DC/DC converter, a common end connected between the negative output end of an N/2th DC/DC converter and the positive output end of an (N/2+1)th DC/DC converter is connected with a neutral line, and 1≤i≤N−1, the load being connected between the positive output end of the DC/DC conversion module and the negative output end of the DC/DC conversion module.

In one possible implementation, the battery is a lithium battery.

In one possible implementation, the control module is further configured for controlling a charging power supply to charge the battery through the DC/DC conversion module when the battery power supply device is configured to charge the battery.

In one possible implementation, the control module is further configured for controlling N respective charging voltages of the N DC/DC converters to be equal when the battery is charged.

The present application further provides a battery power supply system including a plurality of battery power supply devices according to anyone of above implementations; and a plurality of output ends of the plurality of battery power supply devices are connected in parallel.

Advantageous Effects of the Disclosure

The present application provides a battery power supply device and a battery power supply system. The battery power supply device includes a control module, a DC/DC conversion module and a battery. Since the DC/DC conversion module includes N DC/DC converters in series or in parallel, when the battery power is constant, more output current can be obtained when the N DC/DC converters are in parallel, and more output voltage can be obtained when the N DC/DC converters are in series. Embodiments enable a battery power supply device or system to meet voltage requirements of different loads and improve applicability of a battery.

BRIEF DESCRIPTION OF THE DRAWINGS

In order to more clearly illustrate the technical solutions in the embodiments of the application, the following description briefly introduces the drawings used in the embodiments or the prior art, and it is obvious that the drawings in the following description are only some embodiments of the application, and that other drawings can be obtained from these drawings by a person skilled in the art without involving any inventive effort.

DETAILED DESCRIPTION OF ILLUSTRATIVE EMBODIMENTS

The core of the present application is to provide a battery power supply device and a battery power supply system, which can meet the voltage requirements of different loads and improve the applicability of the battery module.

In order to make the purpose, technical scheme and advantages of the embodiments of the present application more clear, the technical scheme in the embodiments of the present application will be described clearly and completely below in combination with the drawings in the embodiments of the present application. Obviously, the described embodiments are part of the embodiments of the present application, not all of them. Based on the embodiments of the present application, all other embodiments obtained by ordinary technicians in the art without creative work belong to the scope of the present application. It should be understood that the term "or" used in the specification and the appended claims of the present application refers to any combination of one or more of the items listed in the associated and all possible combinations, and including these combinations.

Figure 1:
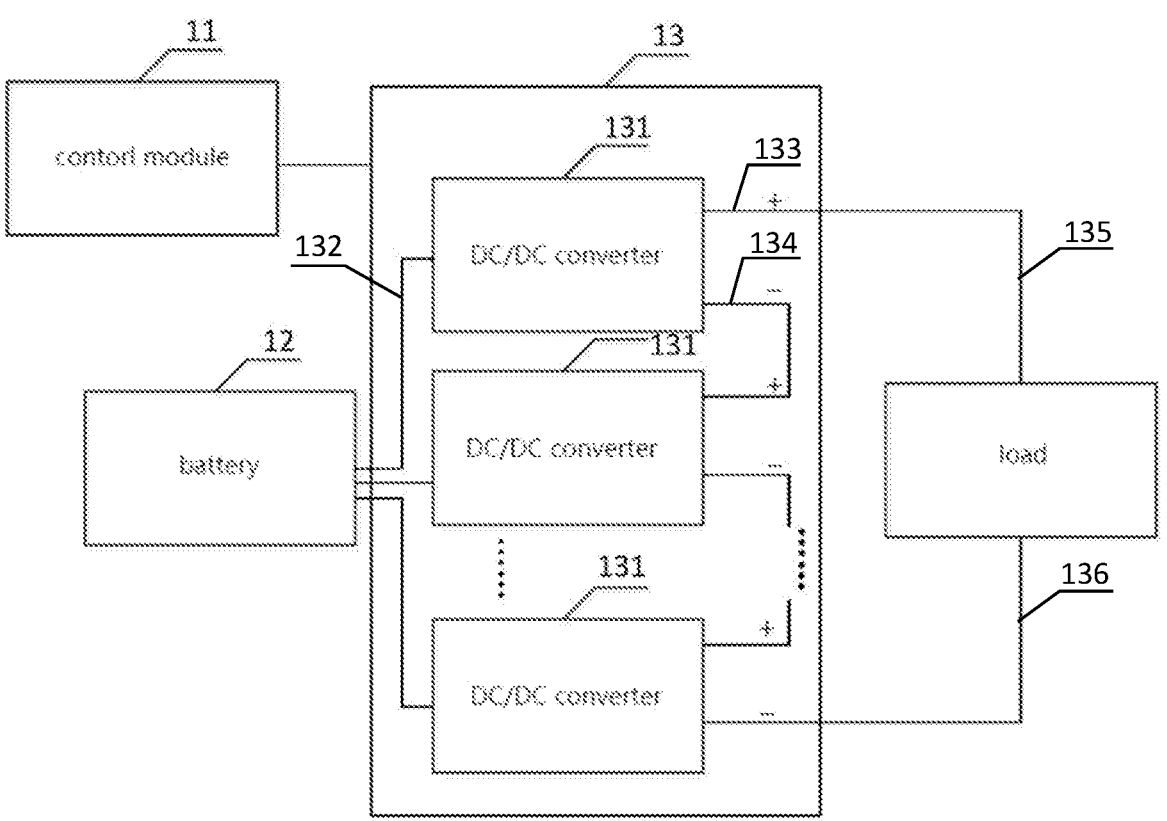
FIG. 1 is a structure diagram of a battery power supply device provided by one embodiment of the present application.
Figure 2:
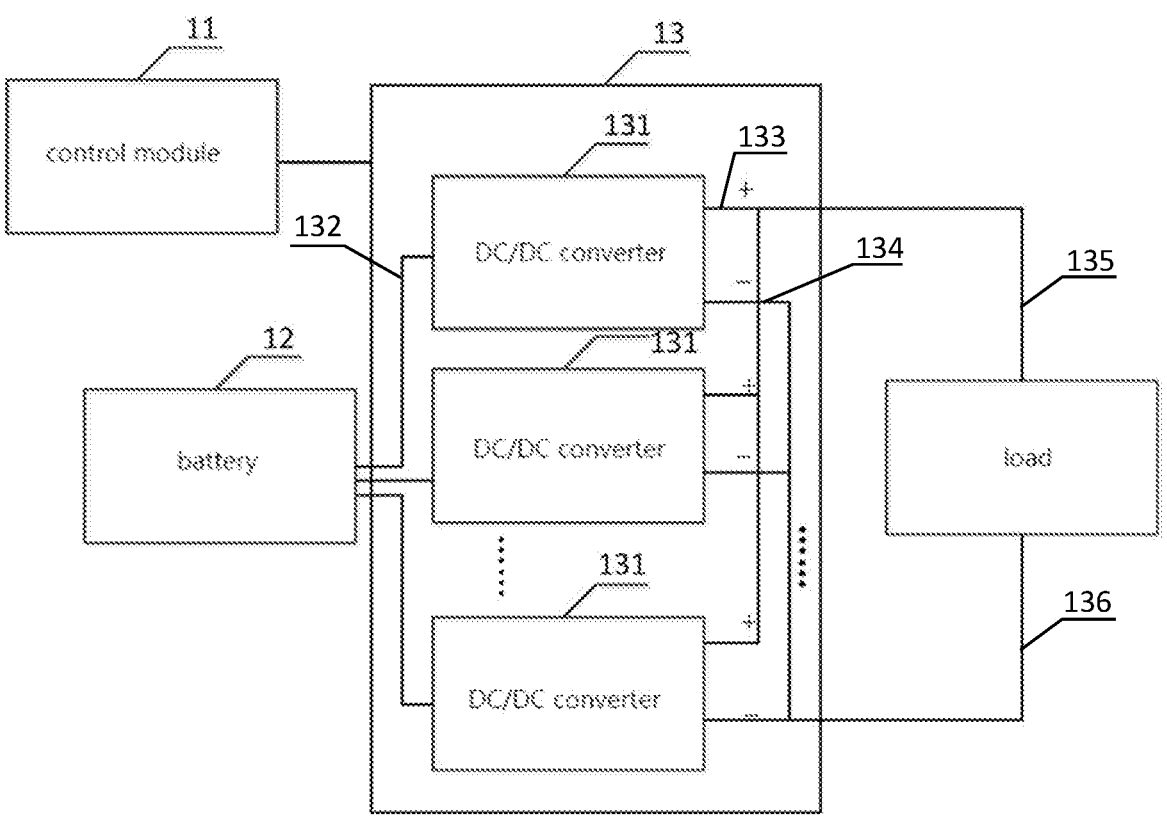
FIG. 2 is a structure diagram of a battery power supply device provided by another embodiment of the present application.

Please refer to FIG. 1 and FIG. 2. FIG. 1 is the structural diagram of one battery power supply device provided by the embodiment of the present application, and FIG. 2 is the structural diagram of another battery power supply device provided by the embodiment of the present application. In FIG. 1, the N output ends of N DC/DC converters 131 are connected in series; and in FIG. 2, the N output ends of N DC/DC converters 131 are connected in parallel.

The embodiments of the present application provide a battery power supply device, which includes: a control module 11, a battery 12 and a DC/DC conversion module 13; the DC/DC conversion module 13 is connected between the battery 12 and a load, the DC/DC conversion module 13 includes N DC/DC converters 131, the N DC/DC converters 131 include, respectively, N input ends 132 of that are connected with the battery 12, and include, respectively, N output ends of that are connectable in series or in parallel, N being an integer not less than 2, for example, N may be 2, 3, 4, 5, 6, etc.; and the control module 11 is connected with the DC/DC conversion module 13, and is configured for determining a connection mode of the N output ends of the N DC/DC converters 131 when the battery power supply device supplies power to the load, and controlling, according to the connection mode, an output voltage or an output current of the DC/DC conversion module 13 to supply power to the load, the connection mode being in series or in parallel.

Considering that when the battery 12 supplies power to different loads, different loads require different voltages or currents. In order to enable the same battery 12 to connect different loads, in this embodiment, the DC/DC conversion module 13 is set to change the output voltage or output current of the battery 12, and control the output voltage or output current of the DC/DC conversion module 13 through the control module 11. It is apparent to those of ordinary skill in the art that when the output voltage is adjusted, the output current will correspondingly change; when the output current is adjusted, the output voltage will change correspondingly. The DC/DC conversion module 13 includes N DC/DC converters 131. The DC/DC converter 131 is a direct current-direct current converter that can convert the basic DC power supply to other voltage types. The control module 11 may be composed of electronic hardware, computer software, or a combination of the two.

It is apparent to those of ordinary skill in the art that each DC/DC converter 131 includes an input end 132 and an output end, the output end includes a positive output end 133 and a negative output end 134; and the DC/DC conversion module 13 includes an input end and an output end, the output end includes a positive output end 135 and a negative output end 136. N input ends 132 of the N DC/DC converters 131 form the input end of the DC/DC conversion module 13, and N output ends of the N DC/DC converters 131 form the output end of the DC/DC conversion module 13.

Specifically, when the N output ends of the N DC/DC converters 131 in the DC/DC conversion module 13 are connected in series, the battery power supply device can output a larger output voltage. For example, if the maximum voltage that each DC/DC converter 131 can output is Vdc, the maximum output voltage of the N DC/DC converters 131 can reach N times Vdc. According to the needs of the load connected by the user, the duty cycle of the switch tube in the DC/DC converter 131 can be adjusted, output voltage from 0 to N times of Vdc to the load, which can meet the high voltage demand of the load. When the N output ends of the N DC/DC converters 131 in the DC/DC conversion module 13 are connected in parallel, the battery power supply device can output a larger output current. For example, if the maximum current that each DC/DC converter 131 can output is I, the maximum output current of the N DC/DC converters 131 can reach N times I, which can adjust the duty cycle of the switch tube in the DC/DC converter 131 according to the needs of the load connected by the user, output the current in the range of I from 0 to N times to the load, which can output higher power to the load under the condition of meeting the voltage demand of the load. The duty cycle refers to the proportion of the power on time to the total time in a work cycle. When the output end of DC/DC conversion module 13 are connected with different loads, users can connect the N output ends of N DC/DC converters 131 in series or in parallel according to the actual requirements of different loads, such as the rated voltage or rated current of the load. The control module 11 can control the output voltage or output current of the output end of the DC/DC conversion module 13 according to the connection mode of the N output ends of the N DC/DC converters 131. For example, when the N output ends of the N DC/DC converters 131 are connected in series, the control module 11 controls the output end of the DC/DC conversion module 13 to output a larger output voltage. When the N output ends of the N DC/DC converters 131 are connected in parallel, the control module 11 controls the output end of the DC/DC conversion module 13 to output a larger output current.

To sum up, in this embodiment, since the DC/DC conversion module 13 includes N DC/DC converters 131 in series or in parallel, when the power of the battery 12 is fixed, when N DC/DC converters 131 are in parallel, greater output current can be obtained, higher power can be output to the load under the condition of meeting the voltage demand of the load, and when N DC/DC converters 131 are in series, greater output voltage can be output. Embodiments enable a battery power supply device to meet voltage requirements of different loads and improve applicability of a battery.

Figure 3:
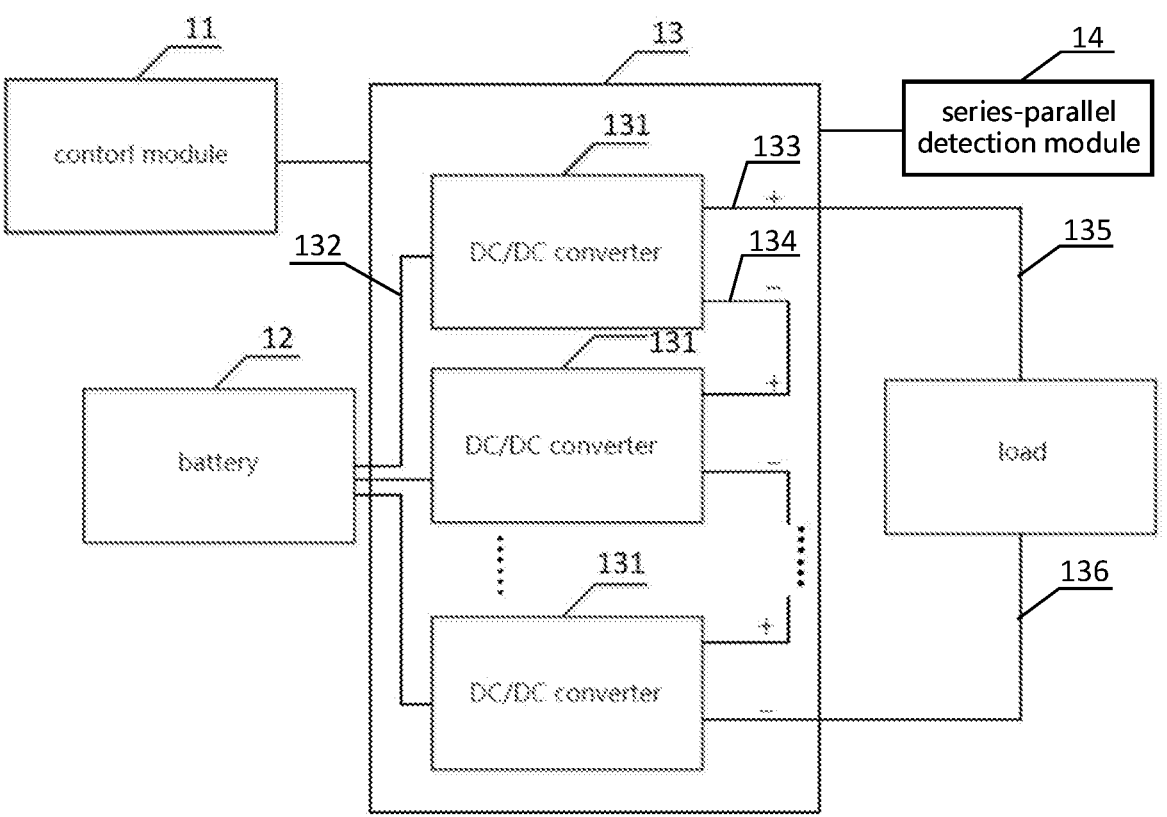
FIG. 3 is a structure diagram of a battery power supply device provided by another embodiment of the present application.
Figure 4:
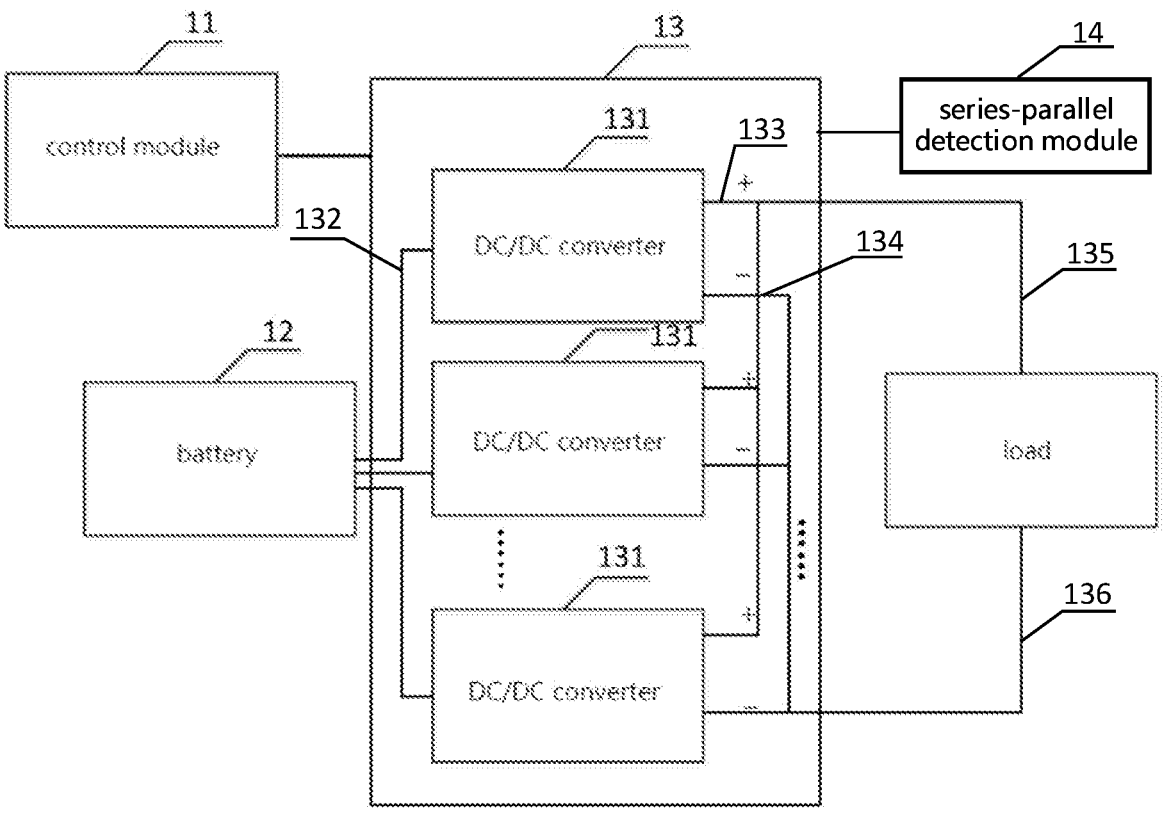
FIG. 4 is a structure diagram of a battery power supply device provided by another embodiment of the present application.

On the basis 0f the above embodiments:

Please refer to FIG. 3 and FIG. 4, in one embodiment, an output end of each DC/DC converter 131 of the N DC/DC converters 131 includes a positive output end 133 and a negative output end 134, N is 2, a positive output end 133 of a first DC/DC converter 131 of the N DC/DC converters 131 is a positive output end 135 of the DC/DC conversion module 13, a negative output end 134 of a second DC/DC converter 131 of the N DC/DC converters 131 is a negative output end 136 of the DC/DC conversion module 13, the load is connected between the positive output end 135 of the DC/DC conversion module 13 and the negative output end

136 of the DC/DC conversion module 13, and the battery power supply device further includes: a series-parallel detection module 14, configured for detecting a voltage between the negative output end 133 of the first DC/DC converter 131 and the positive output end 134 of the second DC/DC converter 131.

Optionally, determining the connection mode of the N output ends of the N DC/DC converters 131 includes: when the voltage detected by the series-parallel detection module 14 is 0, determining that the connection mode of the N output ends of the N DC/DC converters 131 is in series; and when the voltage detected by the series-parallel detection module 14 is not 0, determining that the connection mode of the N output ends of the N DC/DC converters 131 is in parallel.

When N is 2, if the maximum voltage that each DC/DC converter 131 can output is Vdc, when the user sets the two output ends of DC/DC converter 131 in series according to the needs of the load, the maximum output voltage of two DC/DC converters 131 can reach twice Vdc, and the control module 11 can output the voltage within the range of 0 to twice Vdc to the load by adjusting the duty cycle of the switch tube in DC/DC converter 131 according to the needs of the load connected by the user, for meeting the high voltage demand of the load. When the two output ends of two DC/DC converters 131 in the DC/DC conversion module 13 are connected in parallel, the battery power supply device can output a larger output current. If the maximum current that each DC/DC converter 131 can output is I, the maximum output current of the two DC/DC converters 131 can reach twice I, which can adjust the duty cycle of the switch tube in the DC/DC converter 131 according to the needs of the load connected by the user, output the current within the range of I from 0 to 2 times to the load, which can output higher power to the load under the condition of meeting the voltage demand of the load. In this embodiment, a series-parallel detection module 14 is set to detect the voltage between the negative output end 134 of the first DC/DC converter 131 and the positive output end 133 of the second DC/DC converter 131, the control module 11 determines the connection mode of the N output ends of N DC/DC converters 131 according to the voltage between the negative output end 134 of the first DC/DC converter 131 and the positive output end 133 of the second DC/DC converter 131.

Specifically, when the output ends of N DC/DC converters 131 are connected in series, the potential of the negative output end 134 of the first DC/DC converter 131 is equal to the positive output end 133 of the second DC/DC converter 131, so the voltage between the negative output end 134 of the first DC/DC converter 131 and the positive output end 133 of the second DC/DC converter 131 is 0, when the voltage between the negative output end 134 of the first DC/DC converter 131 and the positive output end 133 of the second DC/DC converter 131 is 0, the control module 11 determines that the N output ends of the N DC/DC converters 131 are in series. When the N output ends of the N DC/DC converters 131 are connected in parallel, the potential of the negative output end 134 of the first DC/DC converter 131 and the positive output end 133 of the second DC/DC converter 131 are not equal, so the voltage between the negative output end 134 of the first DC/DC converter 131 and the positive output end 133 of the second DC/DC converter 131 is not 0, when the voltage between the negative output end 134 of the first DC/DC converter 131 and the positive output end 133 of the second DC/DC converter 131 is not 0, the control module 11 determines that the N output ends of N DC/DC converters 131 are in parallel.

Of course, in this embodiment, taking N as 2 as an example, it is apparent to those of ordinary skill in the art that when N is greater than 2, the battery power supply device may also include a series-parallel detection module 14, which can detect the voltage between the negative output end 134 of the previous DC/DC converter 131 and the positive output end 133 of the next DC/DC converter 131. The judgment method is the same as when N is 2, so it will not be repeated here.

In addition, the series-parallel detection module 14 herein may be, but is not limited to, a voltmeter.

To sum up, in this embodiment, the control module 11 determines the connection mode of the N output ends of the N DC/DC converters 131 according to the voltage between the negative output end 134 of the first DC/DC converter 131 and the positive output end 133 of the second DC/DC converter 131 detected by the series-parallel detection module 14. The implementation mode is easy and the circuit design is simple.

Please refer to FIG. 3 and FIG. 4, in another embodiment, the battery power supply device further includes a series-parallel detection module 14 configured for detecting the output voltage of the DC/DC conversion module 13.

Optionally, determining the connection mode of the N output ends of the N DC/DC converters 131 includes: when the output voltage is greater than a preset voltage threshold, determining that the connection mode of the N output ends of the N DC/DC converters 131 is in series; and when the output voltage is not greater than the preset voltage threshold, determining that the connection mode of the N output ends of the N DC/DC converters 131 is in parallel.

Because when the N output ends of the N DC/DC converters 131 are connected in series, the output voltage of the DC/DC conversion module 13 is greater than that of the N DC/DC converters 131 when the N output ends are connected in parallel, in this embodiment, the connection mode of the N DC/DC converters 131 is determined by detecting the output voltage of DC/DC conversion module 13 and comparing it with the preset voltage threshold. The preset voltage threshold value here may, but is not limited to, be set by a technician according to the maximum voltage value that can be output by a single DC/DC converter 131. For example, when the N output ends of the N DC/DC converters 131 are connected in parallel, the maximum voltage output by the N DC/DC converters 131 is Vdc, that is, the maximum voltage output by DC/DC conversion module 13 is Vdc. When the N output ends of the N DC/DC converters 131 are connected in series, the voltage output by the N DC/DC converters 131, that is, the voltage output by DC/DC conversion module 13 is usually greater than the maximum voltage output by a single DC/DC converter 131. Therefore, the preset voltage threshold may be set to Vdc. When the output voltage of the DC/DC conversion module 13 detected by the series-parallel detection module 14 is greater than the preset voltage threshold, the control module 11 determines that the N DC/DC converters 131 are in series, and when the output voltage of the DC/DC conversion module 13 detected by the series-parallel detection module 14 is not greater than the preset voltage threshold, the control module 11 determines that the N DC/DC converters 131 are in parallel. With this setting, this embodiment realizes the function of determining the connection mode of the N DC/DC converters 131, and the implementation mode is simple. It is apparent to those of ordinary skill in the art that the series-parallel detection module 14 in the above two embodiments can exist either or at the same time.

In one embodiment, the control module 11 is further configured for: when the connection mode of the N output ends of the N DC/DC converters 131 is in series, stabilizing N voltages that are output respectively by the N DC/DC converters 131 such that the output voltage of the DC/DC conversion module 13 is equal to a target voltage; and when the connection mode of the N output ends of the N DC/DC converters 131 is in parallel, equalizing N currents that are output respectively by the N DC/DC converters 131 such that the N currents are equal.

Considering that when the N DC/DC converters 131 in the DC/DC conversion module 13 are connected in series, the output voltage of the DC/DC conversion module 13 is large, and the output voltage may fluctuate, so that the output voltage of the DC/DC conversion module 13 is not equal to the voltage required by the load, that is, the output voltage of the DC/DC conversion module 13 is not equal to the target voltage. Therefore, in this embodiment, when the N output ends of the N DC/DC converters 131 are connected in series, the control module 11 will respectively stabilize the N voltages output by the N DC/DC converters 131, so that the output voltage of the DC/DC converter module 13 is equal to the target voltage.

Considering that when the N DC/DC converters 131 in the DC/DC conversion module 13 are connected in parallel, the N currents output by the N DC/DC converters 131 are inconsistent, which may cause the battery power supply device to fail to work normally, therefore, in this embodiment, if the control module 11 determines that the N DC/DC converters 131 are connected in parallel, the N currents output by the N DC/DC converters 131 will be equalized by the control module 11, so that the N currents of the N DC/DC converters 131 are equal, thus, the battery power supply device can work stably and reliably, and give full play to the advantages of parallel connection, that is, greater output current can be obtained.

Please refer to FIG. 1 and FIG. 3, in one embodiment, an output end of each DC/DC converter 131 of the N DC/DC converters 131 includes a positive output end 133 and a negative output end 134, the connection mode of the N output ends of the N DC/DC converters 131 is in series, the positive output end 133 of a first DC/DC converter 131 of the N DC/DC converters 131 is a positive output end 135 of the DC/DC conversion module 13, the negative output end 134 of an Nth DC/DC converter 131 of the N DC/DC converters 131 is a negative output end 136 of the DC/DC conversion module 13, the negative output end 134 of an ith DC/DC converter 131 is connected with the positive output end 134 of an (i+1)th DC/DC converter 131, and $1 \leq i \leq N-1$, the load being connected between the positive output end 135 of the DC/DC conversion module 13 and the negative output end 136 of the DC/DC conversion module 13. This setting can make the physical connection relationship between multiple DC/DC converters 131 more organized, and prevent the physical connection relationship from being too messy and prone to errors.

Figure 5:
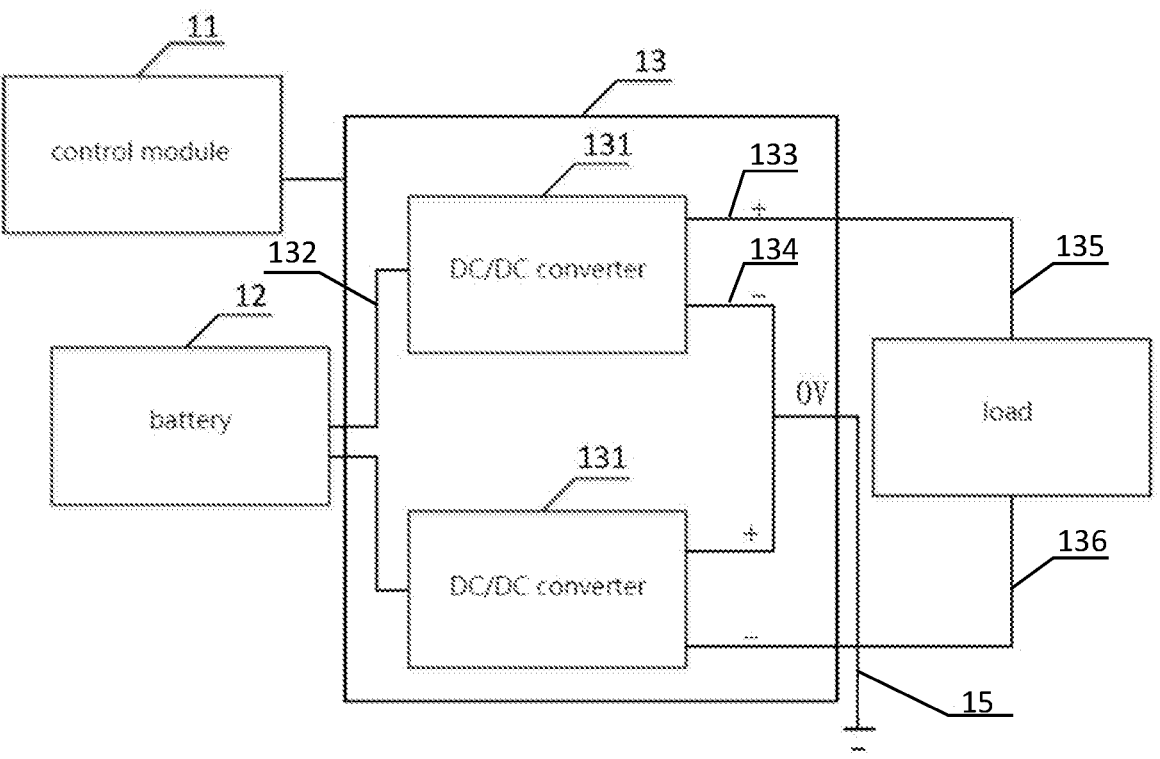
FIG. 5 is a structure diagram of a battery power supply device provided by another embodiment of the present application.

Please refer to FIG. 5, in one embodiment, an output end of each DC/DC converter 131 of the N DC/DC converters 131 includes a positive output end 133 and a negative output end 134, N is an even number and the connection mode of the N output ends of the N DC/DC converters 131 is in series, the positive output end 133 of a first DC/DC converter 131 of the N DC/DC converters is a positive output end 135 of the DC/DC conversion module 13, the negative output end 134 of an Nth DC/DC converter 131 of the N DC/DC converters 131 is a negative output end 136 of the DC/DC conversion module 13, the negative output end 134 of an ith DC/DC converter 131 is connected with the positive output end 133 of an (i+1)th DC/DC converter 131, a common end connected between the negative output end 134 of an N/2th DC/DC converter 131 and the positive output end 133 of an (N/2+1)th DC/DC converter 131 is connected with a neutral line 15, and $1 \leq i \leq N-1$, the load being connected between the positive output end 135 of the DC/DC conversion module 13 and the negative output end 136 of the DC/DC conversion module 13. It is apparent to those of ordinary skill in the art that the neutral line 15 has zero potential, which can make the voltage on both sides of the neutral line 15 change from negative to positive, so as to adapt to more voltage requirements.

When the maximum output voltage of a single DC/DC converter 131 is Vdc, using the above connection method, the control module 11 can make the DC/DC conversion module 13 output a voltage ranging from $-N/2$ times Vdc to $N/2$ times Vdc by adjusting the duty cycle of the switches in each DC/DC converter 131, which can meet the needs of more loads and expand the application range of the battery power supply device.

For details, please refer to FIG. 5, which is the structural diagram of another battery power supply device provided by the present application. For example, when N is equal to 2, the positive output end 133 of the first DC/DC converter 131 is the positive output end 135 of the DC/DC conversion module 13, the negative output end 134 of the second DC/DC converter 131 is the negative output end 136 of the DC/DC conversion module 13, the negative output end 134 of the first DC/DC converter 131 is connected with the positive output end 133 of the second DC/DC converter 131, and the common end connected with the neutral line 15 is the negative output end 134 of the first DC/DC converter 131 and the positive output end 133 of the second DC/DC converter 131. When the maximum output voltage of a single DC/DC converter 131 is Vdc, the control module 11 can make the DC/DC conversion module 13 output a voltage ranging from $-1/2$ times Vdc to $1/2$ times Vdc by adjusting the duty cycle of the switch tube in each DC/DC converter 131.

In one embodiment, the battery is a lithium battery.

In this embodiment, the battery 12 is a lithium battery, which has significant advantages such as high working voltage, large energy density, low self discharge rate and no memory effect. Of course, in other embodiments, the battery 12 may also be other types with functional characteristics similar to lithium batteries, and there is no restriction on this.

In one embodiment, the control module 11 is further configured for controlling a charging power supply to charge the battery 12 through the DC/DC conversion module 13 when the battery power supply device is configured to charge the battery 12.

In order to facilitate the charging of the battery 12, in this embodiment, the control module 11 is also used to control the charging power supply to charge the battery 12 through the DC/DC conversion module 13 when charging the battery 12, that is, the DC/DC converters 131 in the DC/DC conversion module 13 are bidirectional DC/DC converters 131. No additional charging circuit is required to charge the battery 12, simplifying the circuit design.

In one embodiment, the control module 11 is further configured for controlling N respective charging voltages of the N DC/DC converters 131 to be equal when the battery 12 is charged.

Considering that the voltage obtained by different DC/DC converters 131 points may be different when the battery power supply device is charged, if the voltage obtained by a certain DC/DC converter 131 points is too large, the DC/DC converter 131 may be damaged. Therefore, in this embodiment, when charging the battery power supply device, the control module 11 will also equalize the N voltages of the N DC/DC converters 131 in the DC/DC conversion module 13, so that the N charging voltages of the N DC/DC converters 131 during charging are equal, which improves the stability and ensures the charging safety.

Figure 6:
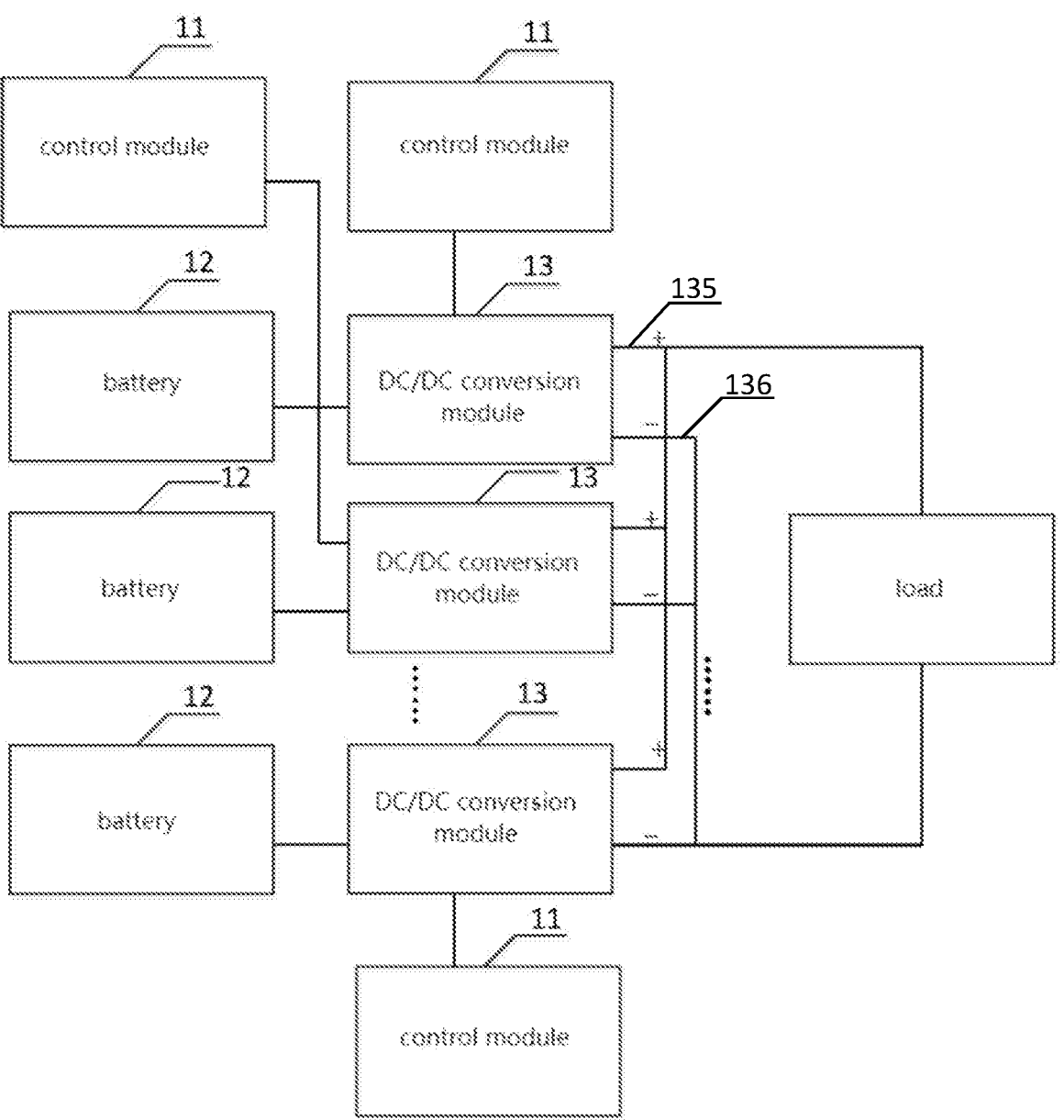
FIG. 6 is a structure diagram of a battery power supply system provided by one embodiment of the present application.

Please refer to FIG. 6, which is the structural diagram of a battery power supply system provided by the embodiment of the present application.

The present application further provides a battery power system including a plurality of battery power supply devices according to anyone of above embodiments; and a plurality of output ends of the plurality of battery power supply devices are connected in parallel.

In order to improve the capacity of the battery 12, in this embodiment, a plurality of battery power supply devices are set, and the output terminals of the plurality of battery power supply devices are connected in parallel. In addition, considering that if the output ends of multiple battery power supply devices are directly connected in parallel, the output currents of the output ends of each battery power supply devices are inconsistent, which may cause the battery power supply devices to fail to work normally, the parallel setting of multiple battery power supply devices can also perform current sharing control on the output currents of all the parallel battery power supply devices. For example, when the output ends of multiple battery power supply devices are connected in parallel, the control module 11 communicates with the control module 11 of other battery power supply devices to control the output current of the DC/DC conversion module 13 connected to itself to be equal to the output current of other parallel DC/DC conversion modules 13, so as to ensure the stable and reliable operation of the battery power supply devices.

In this specification, each embodiment is described in a progressive manner. Each embodiment focuses on the differences with other embodiments, and the same and similar parts of each embodiment can be referred to each other. For the system disclosed in the embodiment, since it corresponds to the device disclosed in the embodiment, the description is relatively simple. Please refer to the description of the method section for details.

It should also be noted that in this specification, relational terms such as first and second are only used to distinguish one entity or operation from another entity or operation, and do not necessarily require or imply any such actual relationship or order between these entities or operations. Moreover, the terms "including/includes/include", "comprising/comprises/comprise" or any other variant thereof are intended to cover non-exclusive inclusion, so that a process, method, article or equipment including a series of elements not only includes those elements, but also includes other elements not explicitly listed, or also includes elements inherent to such process, method, article or equipment. Without further restrictions, the elements defined by the statement "including one . . . " do not exclude that there are other identical elements in the process, method, article or equipment including the elements.

Professionals can further realize that the modules, units and algorithm steps of each example described in combination with the embodiments disclosed herein can be implemented in electronic hardware, computer software, or a combination of the two. In order to clearly explain the interchangeability of hardware and software, the composition and steps of each example have been generally described in the above description according to their functions. Whether these functions are implemented in hardware or software depends on the specific application and design constraints of the technical solution. Professionals and technicians can use different methods to realize the described functions for each specific application, but such implementation should not be considered beyond the scope of the present application.

What is claimed is:

1. A battery power supply device comprising: a control module, a battery and a direct current-direct current (DC/DC) conversion module; wherein the DC/DC conversion module is connected between the battery and a load, the DC/DC conversion module comprises N DC/DC converters, the N DC/DC converters comprise, respectively, N input ends that are connected with the battery, and comprise, respectively, N output ends that are connectable in series or in parallel, N being an integer not less than 2; and the control module is connected with the DC/DC conversion module, and is configured for determining a connection mode of the N output ends of the N DC/DC converters when the battery power supply device supplies power to the load, and controlling, according to the connection mode, an output voltage or an output current of the DC/DC conversion module to supply power to the load, the connection mode being in series or in parallel;

wherein an output end of each DC/DC converter of the N DC/DC converters comprises a positive output end and a negative output end, N is an even number and the connection mode of the N output ends of the N DC/DC converters is in series, the positive output end of a first DC/DC converter of the N DC/DC converters is a positive output end of the DC/DC conversion module, the negative output end of an Nth DC/DC converter of the N DC/DC converters is a negative output end of the DC/DC conversion module, the negative output end of an ith DC/DC converter is connected with the positive output end of an (i+1)th DC/DC converter, a common end connected between the negative output end of an N/2th DC/DC converter and the positive output end of an (N/2+1)th DC/DC converter is connected with a neutral line, and $1 \leq i \leq N-1$, the load being connected between the positive output end of the DC/DC conversion module and the negative output end of the DC/DC conversion module.

2. The battery power supply device according to claim 1, wherein, N is 2, the negative output end of a second DC/DC converter of the N DC/DC converters is the negative output end of the DC/DC conversion module, and the battery power supply device further comprises:

a series-parallel detection module, configured for detecting a voltage between the negative output end of the first DC/DC converter and the positive output end of the second DC/DC converter; and wherein determining the connection mode of the N output ends of the N DC/DC converters comprises:

when the voltage detected by the series-parallel detection module is 0, determining that the connection mode of the N output ends of the N DC/DC converters is in series; and when the voltage detected by the series-parallel detection module is not 0, determining that the connection mode of the N output ends of the N DC/DC converters is in parallel.

3. The battery power supply device according to claim 2, wherein the control module is further configured for controlling a charging power supply to charge the battery through the DC/DC conversion module when the battery power supply device is configured to charge the battery.

4. The battery power supply device according to claim 1, further comprising a series-parallel detection module configured for detecting the output voltage of the DC/DC conversion module; and wherein determining the connection mode of the N output ends of the N DC/DC converters comprises:

when the output voltage is greater than a preset voltage threshold, determining that the connection mode of the N output ends of the N DC/DC converters is in series; and when the output voltage is not greater than the preset voltage threshold, determining that the connection mode of the N output ends of the N DC/DC converters is in parallel.

5. The battery power supply device according to claim 4, wherein the control module is further configured for controlling a charging power supply to charge the battery through the DC/DC conversion module when the battery power supply device is configured to charge the battery.

6. The battery power supply device according to claim 1, wherein the control module is further configured for:

when the connection mode of the N output ends of the N DC/DC converters is in series, stabilizing N voltages that are output respectively by the N DC/DC converters such that the output voltage of the DC/DC conversion module is equal to a target voltage; and when the connection mode of the N output ends of the N DC/DC converters is in parallel, equalizing N currents that are output respectively by the N DC/DC converters such that the N currents are equal.

7. The battery power supply device according to claim 1, wherein the battery is a lithium battery.

8. The battery power supply device according to claim 1, wherein the control module is further configured for controlling a charging power supply to charge the battery through the DC/DC conversion module when the battery power supply device is configured to charge the battery.

9. The battery power supply device according to claim 8, wherein the control module is further configured for controlling N respective charging voltages of the N DC/DC converters to be equal when the battery is charged.

10. A battery power supply system comprising a plurality of battery power supply devices, wherein a plurality of output ends of the plurality of battery power supply devices are connected in parallel, a battery power supply device of the plurality of battery power supply devices comprising: a control module, a battery and a direct current-direct current (DC/DC) conversion module, wherein the DC/DC conversion module is connected between the battery and a load, the DC/DC conversion module comprises N DC/DC converters, the N DC/DC converters comprise, respectively, N input ends that are connected with the battery, and comprise, respectively, N output ends that are connectable in series or in parallel, N being an integer not less than 2; and the control module is connected with the DC/DC conversion module, and is configured for determining a connection mode of the N DC/DC converters when the battery power supply device supplies power to the load, and controlling, according to the connection mode, an output voltage or an output current of the DC/DC conversion module to supply power to the load, the connection mode being in series or in parallel;

wherein an output end of each DC/DC converter of the N DC/DC converters comprises a positive output end and a negative output end, N is an even number and the connection mode of the N output ends of the N DC/DC converters is in series, the positive output end of a first DC/DC converter of the N DC/DC converters is a positive output end of the DC/DC conversion module, the negative output end of an Nth DC/DC converter of the N DC/DC converters is a negative output end of the DC/DC conversion module, the negative output end of an ith DC/DC converter is connected with the positive output end of an (i+1)th DC/DC converter, a common end connected between the negative output end of an N/2th DC/DC converter and the positive output end of an (N/2+1)th DC/DC converter is connected with a neutral line, and $1 \leq i \leq N-1$, the load being connected between the positive output end of the DC/DC conversion module and the negative output end of the DC/DC conversion module.

11. The battery power supply system according to claim 10, wherein, N is 2, the negative output end of a second DC/DC converter of the N DC/DC converters is the negative output end of the DC/DC conversion module, and the battery power supply device further comprises:

a series-parallel detection module, configured for detecting a voltage between the negative output end of the first DC/DC converter and the positive output end of the second DC/DC converter; and wherein determining the connection mode of the N output ends of the N DC/DC converters comprises:

when the voltage detected by the series-parallel detection module is 0, determining that the connection mode of the N output ends of the N DC/DC converters is in series; and when the voltage detected by the series-parallel detection module is not 0, determining that the connection mode of the N output ends of the N DC/DC converters is in parallel.

12. The battery power supply system according to claim 10, wherein the battery power supply device further comprises a series-parallel detection module configured for detecting the output voltage of the DC/DC conversion module; and wherein determining the connection mode of the N output ends of the N DC/DC converters comprises:

when the output voltage is greater than a preset voltage threshold, determining that the connection mode of the N output ends of the N DC/DC converters is in series; and when the output voltage is not greater than the preset voltage threshold, determining that the connection mode of the N output ends of the N DC/DC converters is in parallel.

13. The battery power supply system according to claim 10, wherein the control module is further configured for:

when the connection mode of the N output ends of the N DC/DC converters is in series, stabilizing N voltages that are output respectively by the N DC/DC converters such that the output voltage of the DC/DC conversion module is equal to a target voltage; and when the connection mode of the N output ends of the N DC/DC converters is in parallel, equalizing N currents that are output respectively by the N DC/DC converters such that the N currents are equal.

14. The battery power supply system according to claim 10, wherein the battery is a lithium battery.

15. The battery power supply system according to claim 10, wherein the control module is further configured for controlling a charging power supply to charge the battery through the DC/DC conversion module when the battery power supply device is configured to charge the battery.

16. The battery power supply system according to claim 15, wherein the control module is further configured for controlling N respective charging voltages of the N DC/DC converters to be equal when the battery is charged.

* * * * *